(12) United States Patent
Mangapora

(10) Patent No.: US 6,607,339 B1
(45) Date of Patent: Aug. 19, 2003

(54) FIXING PULLEY WHEELS TO PLATE-LIKE STRUCTURES

(75) Inventor: Bob Mangapora, Canfield, OH (US)

(73) Assignee: BAS Components Limited, Sevenoaks (GB)

( * ) Notice: Subject to any disclaimer, the term of this patent is extended or adjusted under 35 U.S.C. 154(b) by 0 days.

(21) Appl. No.: 09/674,989
(22) PCT Filed: May 7, 1999
(86) PCT No.: PCT/GB99/01442
§ 371 (c)(1), (2), (4) Date: Mar. 19, 2001
(87) PCT Pub. No.: WO99/58863
PCT Pub. Date: Nov. 18, 1999

(30) Foreign Application Priority Data

May 8, 1998 (GB) ................................................ 9809962

(51) Int. Cl.[7] ............................ F16B 37/04; F16B 39/00
(52) U.S. Cl. ..................... 411/107; 411/181; 411/504; 29/525.06; 403/242
(58) Field of Search ................................. 411/107, 179, 411/180, 181, 504, 505; 29/444, 509, 525.06, 525.11; 403/242

(56) References Cited

U.S. PATENT DOCUMENTS

| 3,058,211 A | * | 10/1962 | Axtell ..................... 411/181 X |
| 3,938,239 A | | 2/1976 | Lauth |
| 4,018,257 A | | 4/1977 | Jack ............................... 39/28 |
| 4,966,512 A | * | 10/1990 | Takaku ....................... 411/181 |
| 5,009,557 A | * | 4/1991 | Dessirier ..................... 411/504 |
| 5,015,136 A | * | 5/1991 | Vetter et al. ................. 411/504 |
| 5,333,411 A | | 8/1994 | Tschirschwitz et al. ........ 11/48 |
| 5,690,459 A | | 11/1997 | Donovan et al. |

FOREIGN PATENT DOCUMENTS

| DE | 3715104 | 1/1988 | |
| DE | 4131098 | 3/1993 | ..................... 11/48 |
| EP | 0744522 | 11/1996 | ..................... 11/48 |
| GB | 0318182 | 4/1928 | |
| GB | 2194746 | 3/1988 | |

* cited by examiner

Primary Examiner—Neill Wilson

(57) ABSTRACT

A stud (1) for mounting a pulley (2) to a plate (3) by a cold forming process has a large diameter head (5), a cylindrical shank (6) which acts as the stub shaft for the pulley (2), the end of the shank remote from the head being connected to a smaller diameter shank (7) via a shoulder (9) (which may include an annual grove (10) into which the plate (3) is deformed), and, beyond the smaller diameter shank, an e.g. threaded shaft (8). To resist rotation after the stud (1) is cold formed to the plate (3), the stud (1) has ribs or studs or flat facets on the shoulder or on the narrow shank (7) against which the plate is cold formed.

8 Claims, 4 Drawing Sheets

FIXING PULLEY WHEELS TO PLATE-LIKE STRUCTURES

BACKGROUND AND SUMMARY OF THE INVENTION

This invention relates to fixing pulley wheels to plate-like structures.

There are numerous applications of pulley wheels in a wide variety of mechanical constructions. Very often the pulley wheel is to be attached to a metal sheet and it is well-known to do that by attaching a stub shaft or axle to the sheet, e.g. by spot welding and then fixing a pulley wheel thereon, the pulley wheel being retained, e.g. by a spring clip engaging in a peripheral groove in the stub shaft, conventionally with the interposition of a washer or bush. In many cases, the metal sheet then is has to be fixed in place in the device in question, for which purpose further and separate fixing means are provided. Thus the installation of a pulley wheel in a piece of equipment requires two sorts of fixing process, which is clearly consumptive of machinery, time and manual (or robotic) manipulation.

We have now found that by careful design it is possible to produce a pulley wheel arrangement, where the fixture of the stub shaft for the wheel itself and the provision of fixing means for the assembly of stub shaft on a plate-like metal substrate are combined.

GB 318 182A describes improvements in and relating to securing parts and articles to metal and other plates, sheets and the like by riveting. It discloses, in FIGS. 8 and 9 attaching a bolt with an annular shoulder to a metal plate. DE 41 31 098A discloses, in FIG. 2, a pulley mounted on a bolt.

According to a first feature of the present invention, there is provided a stud having a cylindrical shank of a first diameter connected to a shank portion of a second, smaller diameter via a shoulder having an annular groove, the shank portion mounting a shaft provided with a fixing configuration;

characterised in that
the shank is adapted to act as a stub shaft for a pulley and is provided with a head of enlarged diameter relative to the shank to retain the pulley; the end of the shank remote from the head being connected to the smaller shank portion; the annular groove extending from the plane of the shoulder towards the head; and the shaft extending away from the head.

Such a stub may be used, as set out in claim 6, to mount a pulley to a metal plate by providing in the metal plate a hole of diameter equal to or slightly exceeding that of the smaller shank portion;

placing the pulley over the first diameter shank portion, the axial dimension of the pulley being at most equal to the axial extent of the first diameter shank portion;
inserting the smaller shank portion through the hole in the metal plate, and;
cold forming the smaller diameter shank portion to expand it and fit it securely into the metal plate.

This leaves a stud attached to the metal plate with the pulley wheel mounted to one side of the plate and the shaft extending on the other side. The shaft may be fixed in place where desired simply by inserting it through a suitable hole in the structure of the machine or the like and attaching a mating fixture, for example a nut, optionally with a locking washer, if the nut is not itself self-locking, onto the shaft if it is threaded.

According to a second feature of the invention, there is provided an assembly of a stud, pulley and metal plate, wherein the stud has a head of large diameter relative to a shank extending from the head, the shank being cylindrical and having a first portion constituting a stub shaft for the pulley, and wherein the end of the shank first portion remote from the head is connected to a smaller diameter shank portion via a shoulder, and wherein located on the side of the smaller diameter shank portion and extending away from the head is a shaft having a fixing configuration, there being on one of the shoulder or the smaller diameter shank portion a torsional resistance-enhancing configuration, and wherein the metal plate has an aperture, the edges of which are at least partly deformed into contact with the torsional resistance-enhancing configuration, and the pulley being held captive between the plate and the head of the stud.

Preferably the exterior surface of the smaller diameter shank portion and/or the interior of the annular groove and/or of the shoulder if without a groove is/are provided with a torsional resistance-enhancing configuration; this may be, for example, axial ribs or radial ribs or studs or flat facets around which the metal of the plate deforms during cold-forming. Such formations render the stub shaft resistant to rotation about its axis once it is mounted to the plate, by providing a secure physical interlocking between the formations and the parts of the plate deformed against them.

If the axial dimension of the pulley wheel is less than that of the larger diameter portion of the shank, one or more spacers or washers may be provided as appropriate to prevent the pulley moving axially on the shank after the stud has been installed in the metal plate.

The present invention is of particular value in connection with the construction of automobile window movement systems, where movement of the window, e.g. up or down in a driver or passenger door, is conventionally achieved by mounting the window in generally vertically extending tracks and providing, on the bottom of the window, some form of mechanical linkage which raises or lowers the window itself. The drive for that mechanical linkage is conventionally provided either by a rotatably mounted crank handle set on the inside of a door or it may be produced from an electric motor. In either case, the conventional drive transmission method used is that of an extending belt or wire which runs over a series of pulleys. Mounting the pulleys to the usually metal plate components of the mechanism can save substantial quantities of time in the overall assembly of the window and winder gear.

The invention is illustrated and further explained, by way of example, with reference to a variety of studs adapted for use in window winding gear applications and which are shown in the accompanying drawings, in which:

DESCRIPTION OF THE PREFERRED EMBODIMENTS

Figure 1:
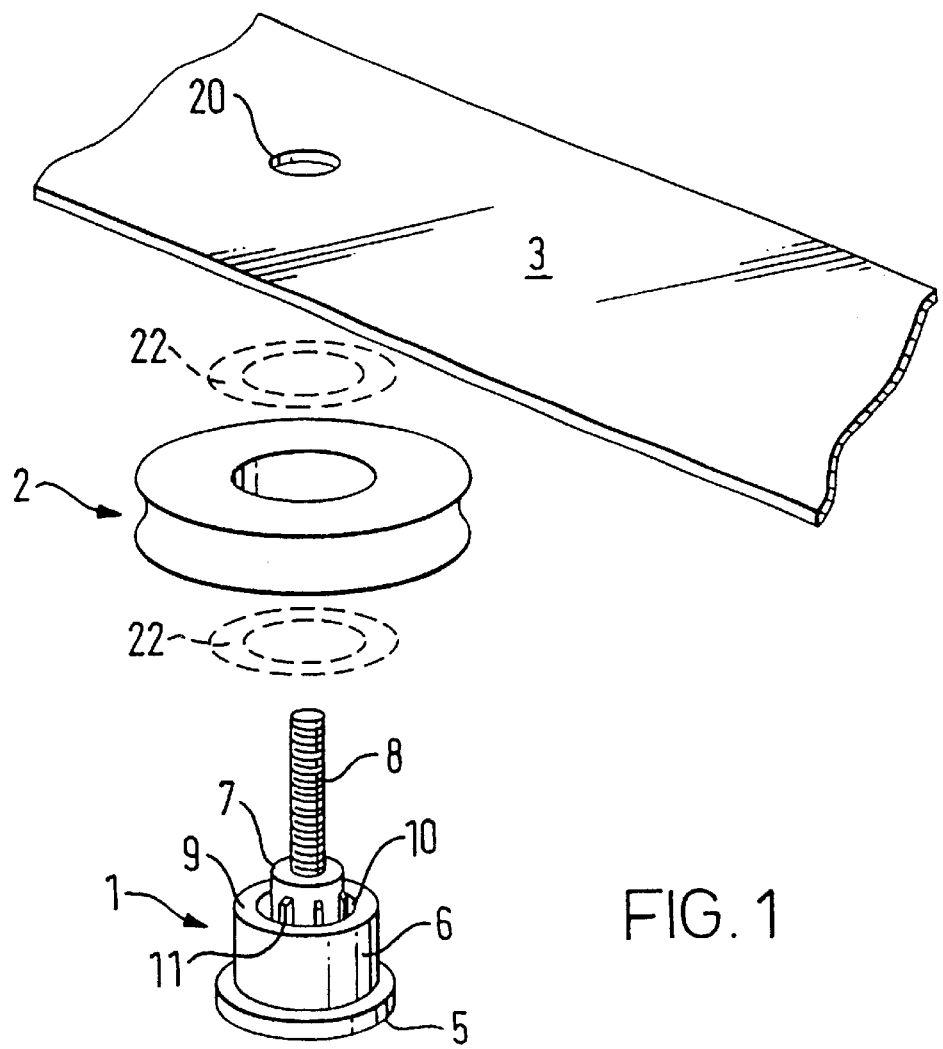
FIG. 1 is an exploded view of a stud, pulley and plate assembly.
Figure 2:
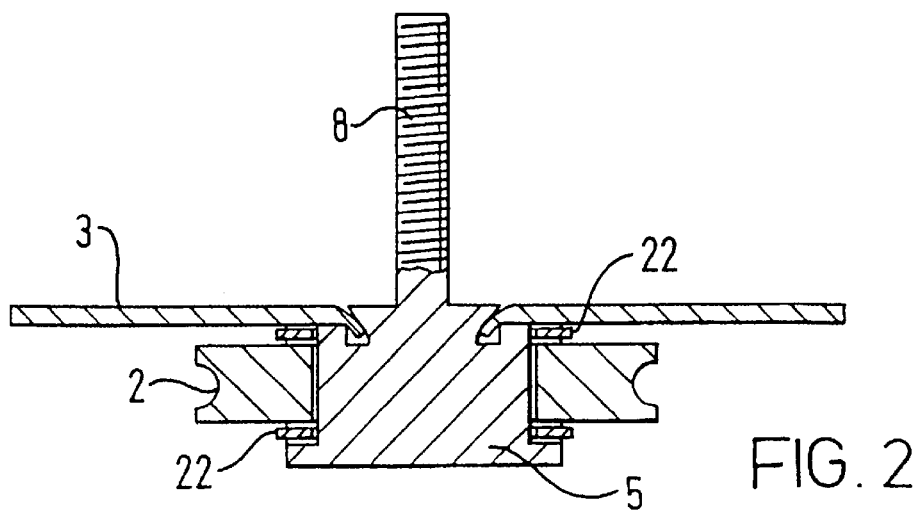
FIG. 2 is a cross section through the assembly in assembled form.

Referring first to FIGS. 1 and 2 of the drawings, FIG. 1 shows a stud 1, pulley wheel 2 and plate 3 prior to assembly. As can be seen, stud 1 consists of a head 5, shank portion 6 fitting the inner aperture in the centre of pulley 2, narrower shank portion 7 and threaded shaft 8. Shank portion 7 is surrounded by a groove 10 in the flat shoulder 9 at the end of shank portion 6, and has six equiangularly spaced external ribs 11, which have tapered ends and which do not extend all of the way along shank portion 7.

Shank portion 7 (or at least the top portion thereof as shown in the drawing) fits a hole 20 in plate 3, which may be thought of as a component of a window lifting assembly.

In order to f it these components together, they are assembled as shown, optionally with the interposition of a pair of spacing washers 22 (shown in dashed lines in FIG. 1), with the shank portion 7 inserted into hole 20. Using a suitable cold-forming tool, the plate 20 is first pushed down on shank portion 7 until it abuts the shoulder 9, and then the upper portion of shank portion 7 is deformed, pushing the edges of the hole 20 into the groove 10, and with the final shape being as indicated in FIG. 2. The stud 1 is now firmly fitted into plate 3, and cannot rotate as the ribs 11 lock into the deformed metal of that sheet. The fastening method is analogous to that described in U.S. Pat. No. 3,938,239 and U.S. Pat. No. 4,018,257, and can be carried out using appropriate press tools in known fashion. More than one stud and pulley assembly may be fitted to the same sheet metal component if appropriate.

The assembly of sheet metal component and pulley(s) may easily be mounted in place, e.g. on suitably apertured flanges in a vehicle door shell, by passing the threaded shafts 8 through the apertures in the door shell and securing the assembly in place by threading a locknut or nut and locking washer on to the shaft 8 and tightening the nut to the desired torque.

Figure 3:
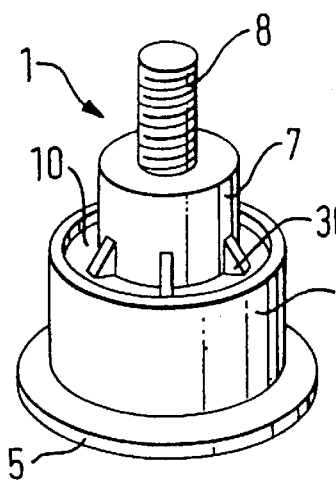
FIGS. 3, 4 and 5 show alternative versions of the stud shown in FIG. 1.
Figure 4:
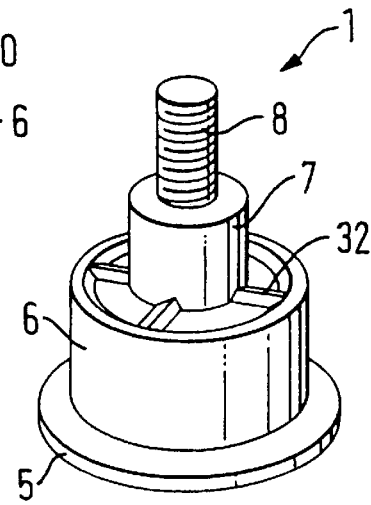
Figure 5:
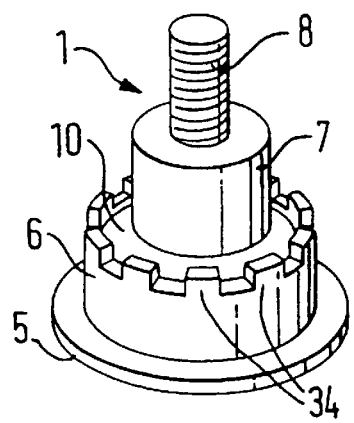

FIGS. 3, 4 and 5 show variations of stud 1, each having an annular groove 10, a head 5, shank portion 6, narrower shank portion 7 and threaded shaft 8. Instead of the ribs 11 on the shank portion 7 as shown in FIG. 1, the embodiment of FIG. 3 is provided with six equi-angularly spaced struts 30 at the junction of the narrower shank portion 7 and the groove 10. In FIG. 4 there are four radially-extending ribs 32 on the surface of the groove 10, and in FIG. 5, the outer edge of the groove is provided with a castellated raised part 34. The features 30, 32, 34 all prevent relative rotation of the stud 1 once it is mounted to a plate.

Other forms of stud, denoted 1A, are shown in FIGS. 6 to 11. Each stud 1A has a head 5, shank portion 6, narrower shank portion 7 and threaded shaft 8, as for stud 1 in FIGS. 1 to 5.

Figure 6:
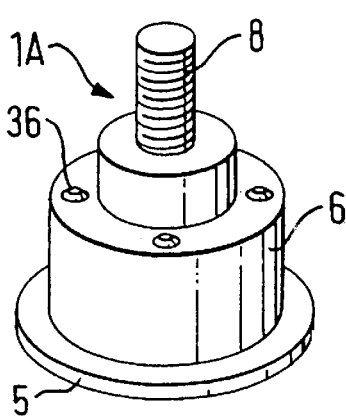
FIGS. 6 to 11 show versions of the stud without an annular groove.
Figure 7:
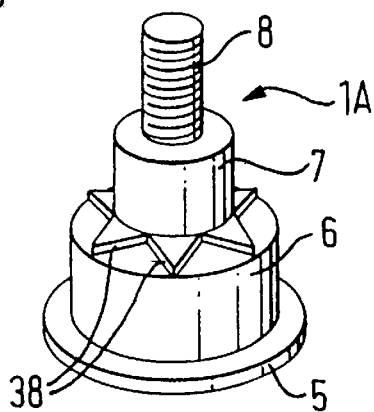
Figure 8:
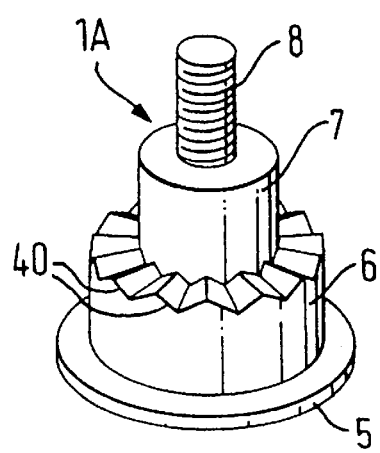

In FIG. 6, the torsional resistance-enhancing means comprise a number of axially-extending studs 36 on the shoulder of the shank portion 6 adjacent the narrower shank portion 7; in FIG. 7, the surface of the shoulder is in triangular toothed form 38, and in FIG. 8 the shoulder is radially fluted, 40.

Figure 10:
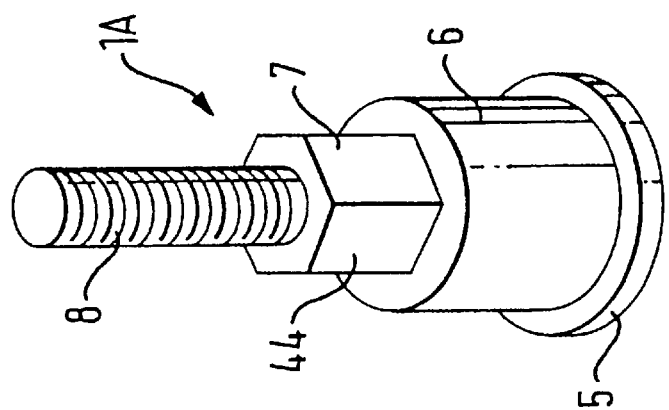
Figure 9:
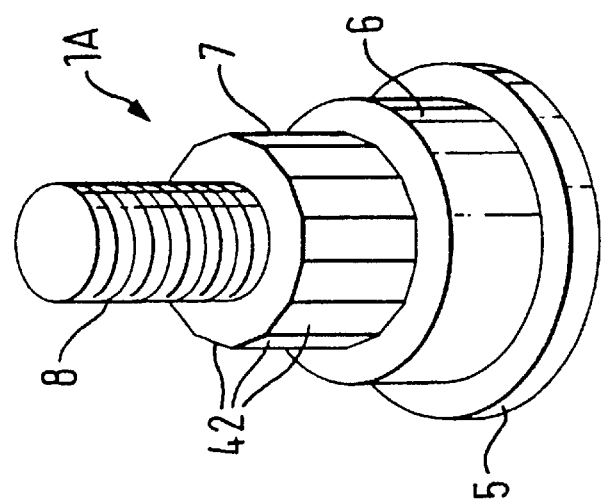

In FIG. 9, the outer surface of the narrower shank portion 7 is provided with a large number of small plane facets 42. In FIG. 10 the narrower shank portion 7 is hexagonal in cross-section with six large facets 44, and in FIG. 11 the narrower shank portion 7 is square in cross-section with four large facets 46.

Figure 11:
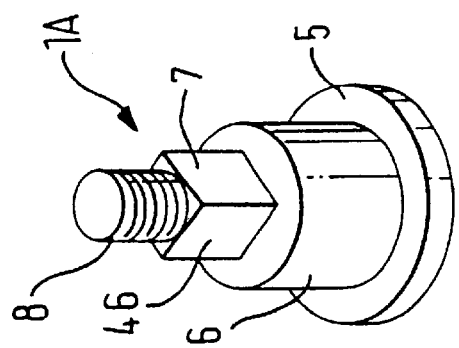
Figure 14:
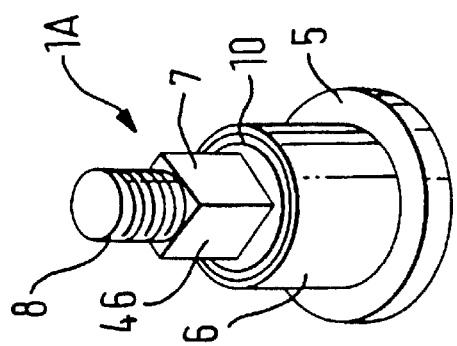
FIGS. 12 to 14 show studs corresponding to those shown in FIGS. 9 to 11 respectively, but including a groove.
Figure 13:
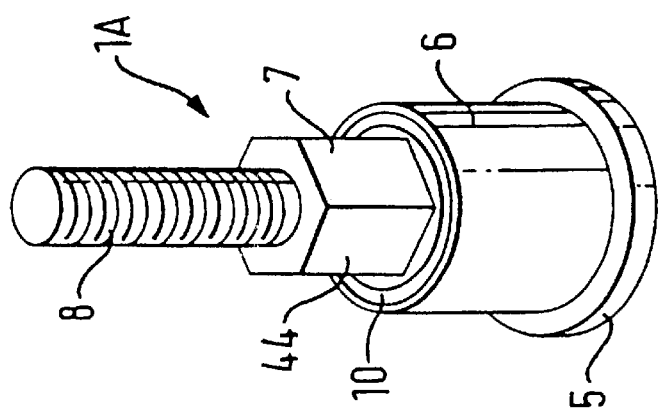
Figure 12:
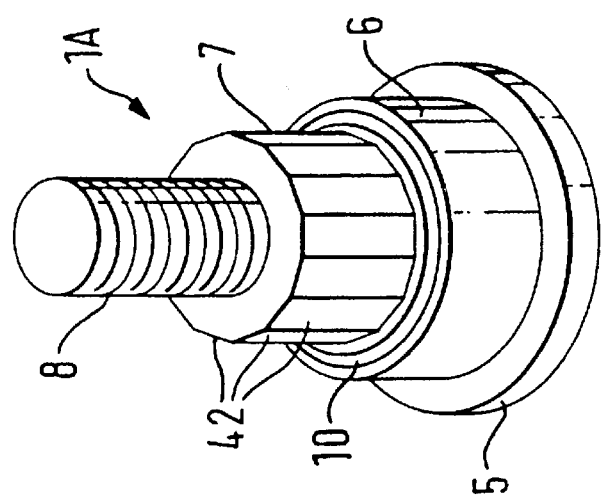

FIGS. 12 to 14 show studs as in FIGS. 9 to 11 respectively, but where in each case instead of a plane shoulder between shank portion 7 and threaded part 8 there is a shoulder with a groove 10 in it, into which groove the edges of the plate 3 are deformed when the assembly of plate, pulley and stud is made.

Although the invention has been described with particular reference to its use in the construction of window actuation assemblies in the automotive industry, it will be appreciated that there are numerous other areas of application of pulleys, in many of which the combined pulley fixing and component fixing approach identified above may be usefully employed.

What is claimed is:

1. An assembly for a stud (1), pulley (2) and metal plate (3), the stud having a head (5) of enlarged diameter relative to a shank extending from the head, the pulley being held captive between the plate and the head of the stud, the shank being cylindrical and having a first portion (6) constituting a stub shaft for the pulley;

and wherein the end of the shank first portion remote from the head is connected to a smaller diameter shank portion (7) via a shoulder (9), and wherein located on the end of the smaller diameter shank portion and extending away from the head is a shaft (8) having a fixing configuration, there being on one of the shoulder and the smaller diameter shank portion a torsional resistance-enhancing configuration (11), and wherein the metal plate has an aperture, the edges of which are at least partly deformed into contact with the torsional resistance-enhancing configuration.

2. An assembly according to claim 1 wherein located to either side of the pulley are one or more spacing washers (22).

3. An assembly according to claim 1 wherein the fixing configuration is an external screw thread.

4. A method of mounting a pulley on a metal plate using a stud having a cylindrical shank of a first diameter connected to a shank portion of a second, smaller diameter via a shoulder having an annular groove, the shank portion mounting a shaft provided with a fixing configuration; the shank being adapted to act as a stub shaft for a pulley and being provided with a head of enlarged diameter relative to the shank to retain the pulley; the end of the shank remote from the head being connected to the smaller shank portion; the annular groove extending from the plane of the shoulder towards the head; and the shaft extending away from the head; the method comprising:

providing in the metal plate a hole of diameter equal to or slightly exceeding that of the smaller shank portion;

placing the pulley over the first diameter shank portion, the axial dimension of the pulley being at most equal to the axial extent of the first diameter shank portion;

inserting the smaller shank portion through the hole in the metal plate; and cold forming the smaller diameter shank portion to expand it and fit it securely into the metal plate.

5. The method according to claim 4, wherein the stud fixing configuration is an external thread.

6. The method according to claim 4, wherein the exterior of the smaller diameter shank portion of the stud has a plurality of axial raised ribs.

7. The method according to claim 6, wherein the ribs of the stud extend substantially from the base of the groove but do not extend away from the head as far as the end of the smaller diameter shank portion.

8. The method according to claim 4, wherein the base of the groove has a plurality of substantially radial ribs.

* * * * *